United States Patent [19]

Paoli

[11] 3,877,542
[45] Apr. 15, 1975

[54] VEHICLE WITH AN AIR CUSHION LIFTING SYSTEM

[76] Inventor: Charles Lucien Paoli, Groupe Scolaire Albert Camus, Port Marly 78, France

[22] Filed: Mar. 17, 1972

[21] Appl. No.: 235,519

[30] Foreign Application Priority Data
Apr. 23, 1971 France .............................. 71.14537

[52] U.S. Cl. ................................. 180/120; 180/127
[51] Int. Cl. ............................................ B60v 1/00
[58] Field of Search ........... 180/117, 116, 120, 121, 180/124, 127, 128

[56] References Cited
UNITED STATES PATENTS

| | | | |
|---|---|---|---|
| 3,066,753 | 12/1962 | Hurley et al. ........................ | 180/120 |
| 3,297,102 | 1/1967 | Cockerell ........................... | 180/127 |
| 3,362,500 | 1/1968 | Bliss .................................. | 180/128 |
| 3,365,018 | 1/1968 | Bliss .................................. | 180/127 |
| 3,387,685 | 6/1968 | Fresh et al. ......................... | 180/127 |
| 3,401,767 | 9/1968 | Barr .................................. | 180/121 |
| 3,429,395 | 2/1969 | Beardsley ........................... | 180/117 |
| 3,444,952 | 5/1969 | Clarke ............................... | 180/117 |
| 3,465,844 | 9/1969 | Page et al. .......................... | 180/127 |
| 3,468,394 | 9/1969 | Winter ............................... | 180/117 |
| 3,468,395 | 9/1969 | Winter ............................... | 180/117 |

*Primary Examiner*—Albert J. Makay
*Assistant Examiner*—Ross Weaver

[57] ABSTRACT

A vehicle with an air-cushion lifting system having improved propulsion, stabilizing and control devices, said vehicle comprising: a platform equipped with flexible bands forming a plurality of skirts and especially a peripheral skirt, means for supplying air under pressure to the cushion formed under said platform by said bands, said flexible bands constituting longitudinal and transverse skirts under the platform, forming with the other said bands, and especially with said peripheral skirts, at least two chambers extending longitudinally side by side, and each capable of being supplied with air under pressure independently of the other chambers, the said chambers being in communication with each other; and air-actuated propulsion devices mounted on said platform.

The vehicle is intended for travelling over rough or smooth surfaces, or land or over water.

23 Claims, 11 Drawing Figures

VEHICLE WITH AN AIR CUSHION LIFTING SYSTEM

The present invention relates to a vehicle in which a cushion of air provides the necessary lift for its displacements, both on the ground and over water.

It is more particularly directed to a system of cushion chambers ensuring excellent stability during the displacement of a vehicle of this type.

It is also concerned with a simple, relatively cheap device which is well adapted to the combined supply systems of an air cushion and propulsion means. A device of this kind is quite suitable for the equipment of an air-cushion vehicle which is required to be of a relatively modest size.

Vehicles have already been proposed which are intended to move over the ground and over water by means of a lifting cushion of air. This method of lift avoids the traditional necessities for runways or roads, and is equally well adapted to the irregularities of the ground and to those of the swell or waves of an expanse of water.

A vehicle of this type essentially comprises a platform on which is fixed a flexible skirt which forms, under this platform, a chamber intended to be supplied with air under pressure from a source carried on the platform, for example a motor-fan set; known propulsion devices with screw propellers of ejection nozzles are also carried on this platform in order to ensure the displacement of this latter when it is supported on this cushion of air.

Now, a first form of embodiment frequently adopted for such vehicles comprises a simple peripheral skirt which, by reason of the possibilities of random diffusion which it allows for the air of the bushion, necessitates large radial dimensions in order to give the platform satisfactory stability.

Furthermore, a second form of embodiment comprises a practically rectangular platform of acceptable dimensions and equipped with a number of skirts, these skirts being arranged in the interior of the chamber formed by a main skirt, so as to form partitions in the cushion of air and thus to give good stability to the platform. However, these multiple skirts which encumber the lower face of the platform interfere with the displacement of the vehicle, especially over water in the case of waves or swell, and in consequence result in a substantial loss of power.

The production, utilization and maintenance of the known air cushion vehicles are therefore expensive.

The invention proposes a remedy for these disadvantages.

It has mainly for its object a system of cushion chambers providing excellent stability for an air cushion vehicle, even if the dimensions of this latter are relatively small. A vehicle of this type comprises essentially:

A platform equipped with skirts, and especially a peripheral skirt;

means for supplying air under pressure to the cushion formed under the platform by the skirts;

conventional propulsion devices mounted on the platform.

According to the invention, the skirts form underneath the platform, at least two chambers extending longitudinally side by side and each capable of being supplied by a source of air under pressure, independently of the supply sources of the other chambers.

In one remarkably advantageous form of construction of a vehicle according to the invention, the lifting force is ensured simply by two longitudinal chambers separated by a partition, the two chambers being identical and being connected to two also identical supply sources so as to form two cushion chambers communicating with each other by passages arranged above the said central partition.

Tests have confirmed that such a system of lift applied to the platform of the vehicle gives this latter an excellent stability.

According to another characteristic feature of the invention, each source of air under pressure comprises a fan of the centrifugal type.

The particular characteristics of flow-rate and pressure of the current of air supplied by a fan of this kind adapt themselves in a remarkable manner to this method of lift on separate cushions. The directions of the variations of the delivery of such a fan are always the reverse of those of the variations of the pressure of the flow of air, which can provide, against the effects of rolling, transverse restoring couples which are very desirable for the transverse stability of the vehicle. In addition, each longitudinal chamber, coupled in this way to a fan of the centrifugal type, is advantageously equipped with at least one transverse partition so as to create in the corresponding cushion, against the effects of pitching, differences of pressure which generate longitudinal restoring couples, air passages being provided between the said chambers above the partitions.

According to another advantageous characteristic of the invention, the propulsion means are constituted by discharge nozzles, respectively connected to the centrifugal pans which ensure the supply of the longitudinal cushion chambers.

The relative simplicity of such a combination of propulsion means with the fans supplying the cushion chambers and the transversely-spaced arrangement of these chambers, is remarkably suitable for a very simple method of operation and steering of the vehicle on its cushion. In consequence, it renders possible inexpensive productions of such a vehicle.

This combination is also favourable to the production of rapid, reliable and relatively economic transport vehicles for passengers, more particularly over water. The dimensions of such a vehicle may furthermore be relatively modest.

Finally, the invention relates to improvements in skirts of air-cushion vehicles. These improvements ensure good performance of the skirts against obstacles, and prevent rapid or premature wear of these skirts, together with losses of power.

Other characteristic features and advantages of the invention will be brought out in the description which follows below with reference to the accompanying drawings, this description and these drawings being given solely by way of example and not in any limitative sense.

In the form of embodiment shown by way of example in FIGS. 1 to 4, there can be seen three longitudinal spars 1d, 1m, 1g, arranged in parallel and forming between them equal distances, and assembled by their extremities on two cross-members 2v, 2r, so as to form a frame which has the general shape of a rectangle, the outer corners of this frame being rounded.

These longitudinal members 1d to 1g and cross-members 2v, 2r are tubular and their transverse sections are practically rectangular. It should be stated that this frame may be produced by utilizing glass fibre fabric, suitably applied on appropriate formers and impregnated with a polymerizable mixture of synthetic resins. The structure thus formed is sufficiently strong and sufficiently light to be able to float on water, even when this frame carries the loads corresponding to the elements and devices described below. This form of construction is appropriate to the water-tightenss of the caissons formed by these longitudinal and transverse members.

Rigid plates arranged edge to edge in the form of a flooring are fixed on the longitudinal members 1d to 1g and the cross-members 2v, 2r of the frame so as to constitute a platform 3 on which is arranged a cockpit 4, for example of the same type as the cabins of small pleasure boats or automobile vehicles. This cabin extends from the extreme portion of the platform carried by the cross-member 2v, slightly beyond the central portion of the platform.

Figures 1, 5:
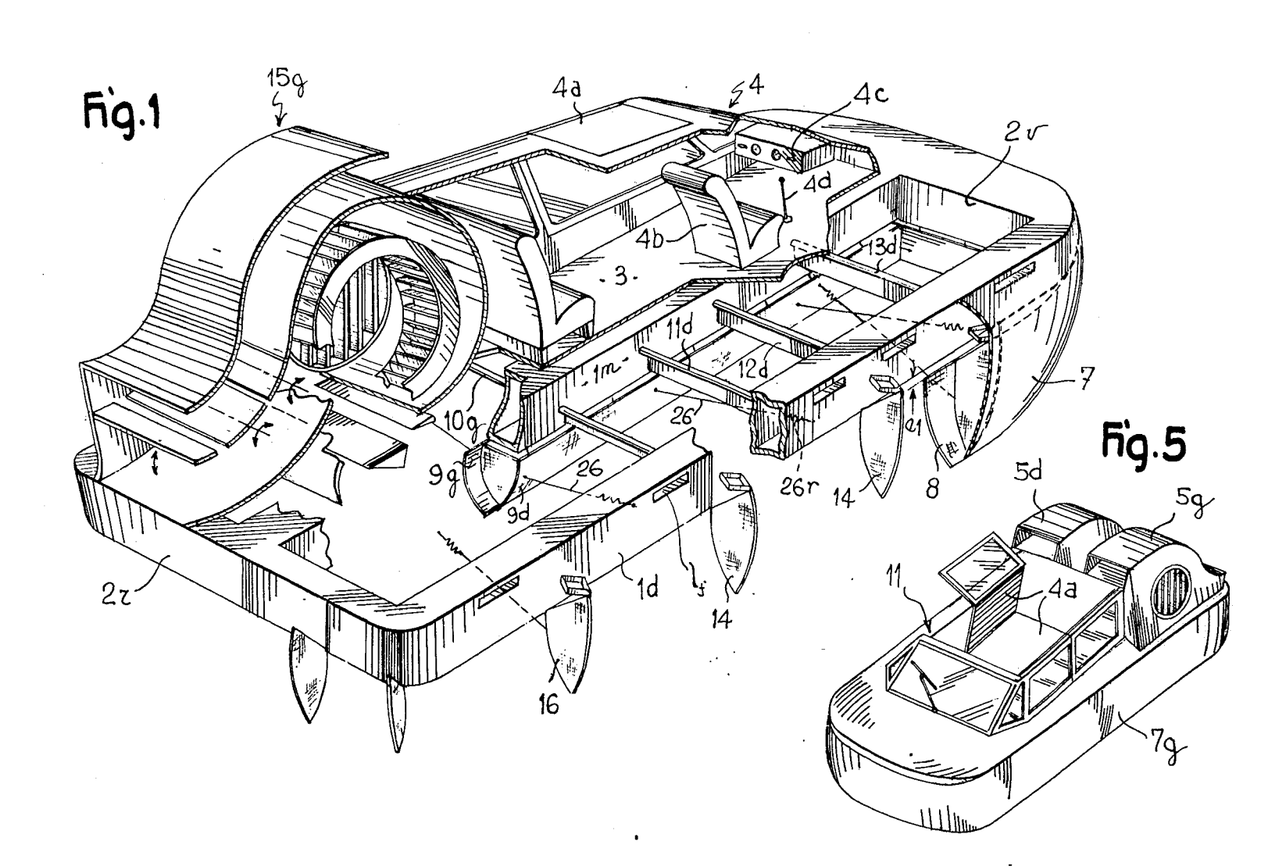
FIG. 1 shows in perspective and with parts broken away, an air cushion vehicle according to the invention.
FIG. 5 is a view in perspective and to a smaller scale, of the vehicle shown in FIGS. 1 to 4.

As shown in FIGS. 1 and 5, this cabin comprises front and side windowed portions, access doors 4a with longitudinal hinges, seats 4b (partly shown in FIGS. 1 and 3), a driving station comprising a dashboard 4c and a lever 4d which will be referred to later.

In addition, two centrifugal fans 5d, 5g, identical with each other, are arranged at the other extremity of the deck 3, corresponding to the cross-member 2r. These fans are arranged symmetrically on each side of the central vertical plane of the longitudinal member 1m of the platform.

These fans are mounted practically level with the rectangular frames formed between the longitudinal members 1d, 1m, 1g so as to leave between tham on the flooring 3 a space for the mounting of a motor-gear-box set 6 carrying a transverse output shaft on the extremities of which the impellers of the two fans 5d, 5g are suitably keyed.

Figure 2:
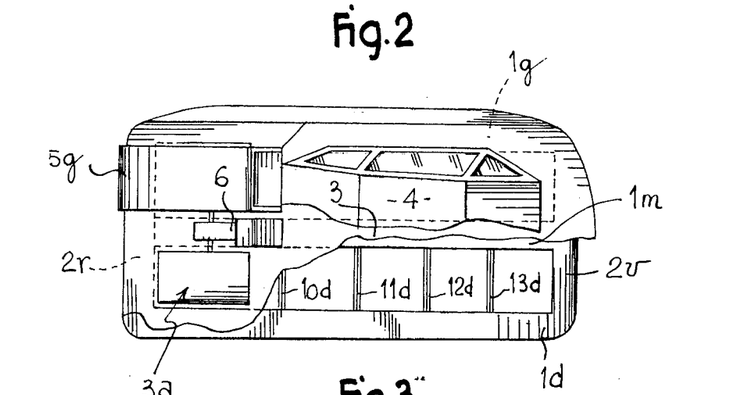
FIGS. 2 to 4 represent respectively, on a smaller scale, in plan view, in transverse section and in longitudinal section, further views of the vehicle of FIG. 1.
Figure 4:
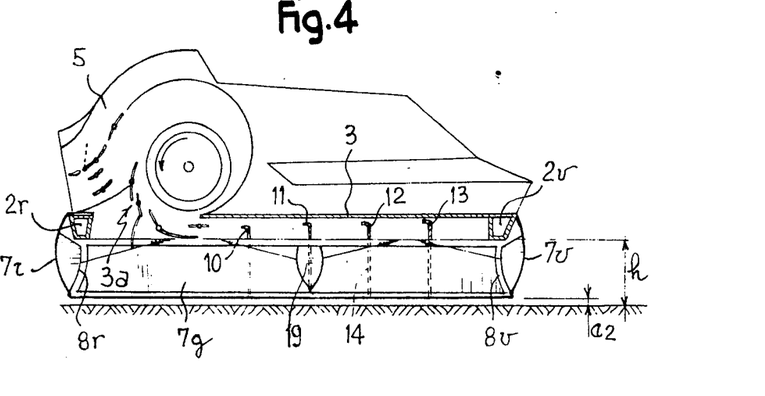
Figure 6:
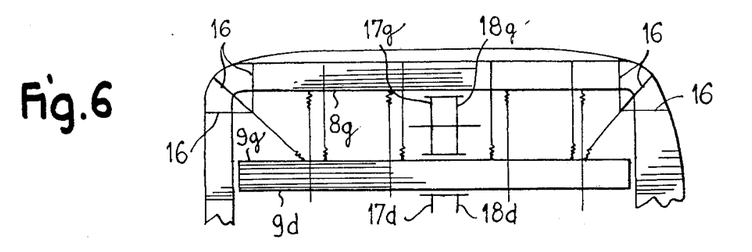
FIG. 6 represents a plan view, to a smaller scale, of a skirt device provided on the vehicle of FIG. 5.

Finally, the scroll of each fan 5d, 5g is equipped with shuttered nozzles described later, and is partly connected to a rectangular opening 3a formed in the flooring of the platform 3 (see FIGS. 2 and 4).

Furthermore, as shown in FIG. 1, a flexible band 7 produced by applying a coating of plastic material such as rubber on a canvas having good mechanical strength, is intimately fixed by its upper edge on the periphery of the platform 3. It thus has two side portions 7d, 7g corresponding to the longitudinal members 1d and 1g, and front portion 7v and rear portion 7r corresponding respectively to the cross-members 2v, 2r.

This band is made-up of flat gores suitably cutout and assembled edge-to-edge so as to produce a curved transverse profile, as will be explained later. The two ends of this band 7 will be intimately fixed to each other.

It will be understood that this band 7 thus arranged in a continuous form, plays the part of a peripheral skirt element forming chambers under the platform 3 which can be supplied with air by the fans 5d, 5g, in order to obtain a conventional lifting cushion for the vehicle constituted by the cabin 4 and the platform 3 with floats (see FIG. 5).

It will be observed that in FIGS. 1, 3 to 5 and 7, the positions of the band 7 and those of the bands described below correspond to the conditions of utilization of the vehicle on its cushion.

A further band 8 also continuous, practically flat and of the same nature as the skirt 7, is suspended here and there under the outer sides of the longitudinal members 1d, 1g and the cross-members 2v, 2r, as will be explained below. For normal conditions of use, this band 8 extends parallel to the band 7 and its upper edge is maintained at a distance el from the bottom of the caissons and cross-members while its lower edge is located practically at the level of the lower edge of the band of the skirt 7.

In addition, these bands 7 and 8 are assembled here and there on the edges of elements 14 arranged transversely. The assembly edges of the elements 14 are in the form of circular arcs which correspond to the profiles intended to be given to the bands 7 and 8 in the position of use.

These elements 14 are made by cutting-out from a canvas similar to that of the bands 7 and 8 in the form of panels. Two of these identical panels are intimately fixed to each other by sewing and sticking. Their edges in the form of circular arcs are also assembled together by sewing and sticking on the opposite faces of the bands 7 and 8 so as thereby to constitute bracing members of a composite skirt 7–8 capable of correct performance when the platform is carried by its air cushion.

In this connection it will be noted that a small transverse space is formed between the lower edges of the bands 7, 8 of this skirt in order to permit, for example, evacuation of any water which may be engaged between these bands when the device is employed on a water surface. However, between two adjacent spaces 14, these lower edges are joined together at intervals by rivets.

However, the rounded portions of the skirt 7, 8 which correspond to the four corners of the platform frame are also provided with spacers 16, similar to the spacers 14. The shape of these spacers is adapted to the profiles which the corners of the skirt 7, 8 should have in the position of use.

Figure 7:
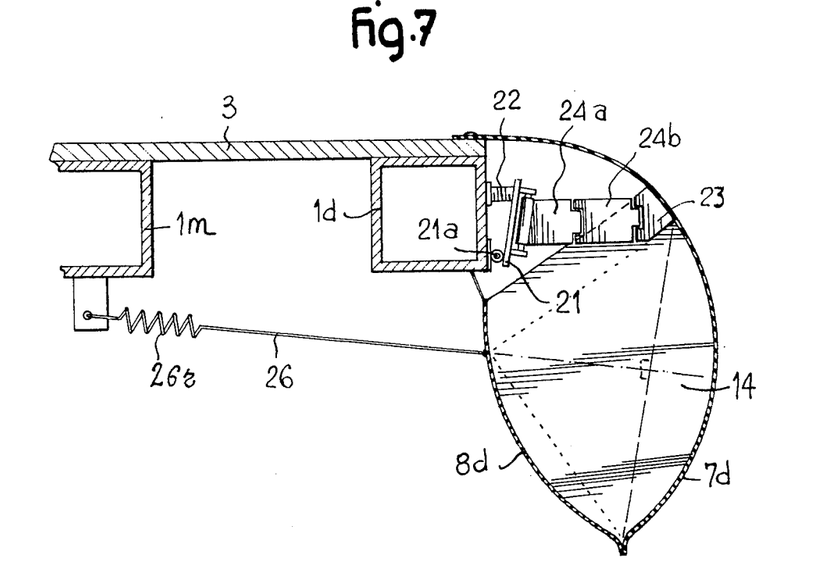
FIG. 7 represents in cross-section to a larger scale, a detail of the skirt device of FIG. 6.

Finally, as shown in FIG. 7, the extremities of flexible cables 26 formed by metal wires plaited to each other, are respectively fixed here and there underneath the flooring 3 and on suitably selected parts of the band 8. These cables are preferably arranged in the transverse planes of the bracing members 14. In the position of use, each cable 26 extends along the centre line of the chord of the arc of the edge adjacent to the band 7, and ensures the suspension of the corresponding portion of the band 8.

In addition, each cable 26 may be provided with a tension spring 26r which provides by its elasticity a restoring position of the portion of the skirt supported by this cable.

It should be noted that, in the case of the form of construction of the skirt from bands 7, 8 having relatively large widths, the height of the bracing panels 14 and 15 may be smaller than the width of the bands 7 and 8. The lower portions of the bands 7 and 8 which are located below the lower edge of their bracing panels are then advantageously associated with each other here and there by hoops 20 having the shape of inverted U-members. These hoops are made of metallic wire having good mechanical elasticity and their arms are engaged in canvas sheaths formed vertically on the opposite faces of the two bands 7 and 8.

Figure 3:
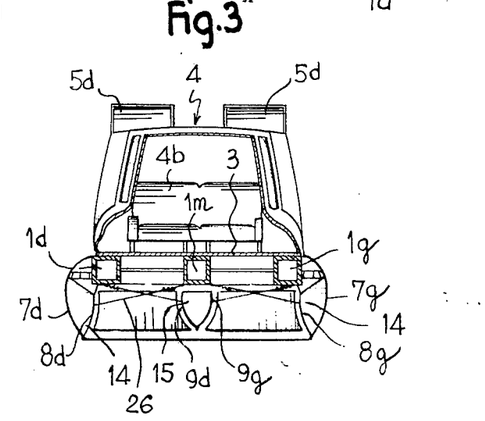

Furthermore, the two sides of the central longitudinal member 1m carry two bands 9d, 9g, practically identical with the longitudinal portions 8d, 8g, respectively suspended underneath the longitudinal members 1d, 1g, as shown in FIG. 3. The width of these bands 9d, 9g is slightly smaller than that of the band 8, and their ends are applied, without being fixed, on the front portion 8v and rear portion 8r of the band 8.

In addition, bracing members 15 similar to the members 14 and having two symmetrical edges in circular arcs, are also assembled transversely by stitching and sticking to the internal faces of these bands 9d, 9g, in order to form a central longitudinal skirt.

This composite skirt 9d, 9g is also suspended from the platform by cables 26 which may be provided with tension springs 26r similar to those described above. These cables are arranged in pairs in the transverse planes of the bracing members 15. Each cable of one set is fixed at one extremity on the convex face of a band (for example 9d) and extends along the centre line of the circular arc of the profile of the other band (9d, 9g).

A suspension of this kind further ensures a small space between the bottom of the longitudinal member 1m and the upper edges of the bands 9d and 9g.

Finally, two further sets of bands 17d, 18d, and 17g, 18g, similar to the bands 9d, 9g but having a width of the same order as that of these latter, are also fixed to each other by bracing panels 19 similar to the bracing members 15, in order to form two transverse partitions. These partitions are freely suspended transversely between the longitudinal sides 8d, 9d and 8g, 9g of the above-mentioned composite skirts, by cables 26 which may be provided with springs 26r.

In addition, profiled elements in the form of blades 10d, 13d and 10g to —g are respectively arranged transversely between the sides of the longitudinal members 1d, 1m on the one hand and the longitudinal members 1m, 1g on the other hand. These blades have smaller heights than those of the sides of the longitudinal members 1d, 1g, and their bottom edges are located at the level of the bottoms of the longitudinal members. These heights are furthermore smaller as the blades are farther distant from the cross-member 2v and are closer to the part of the platform carrying the fans 5d, 5g.

In FIG. 7 there are again seen the longitudinal member 1d and the side 7d of the skirt. In addition, the lower part of the plate 21 is fixed by a longitudinal articulation member 21a, to the outer side of this longitudinal member. Its upper portion is subjected to the thrust of a compression spring 22 which is supported against the side of the longitudinal member.

This plate 21 is fixed in an elastic manner (arrows fl, FIG. 8) to a sole-plate 23 by a conventional system of two sets of arms 24a, 24b, articulated respectively on the plate 21, between each other and on the sole-plate 23 in the form of a lozenge. Central articulation members of this system are associated with each other by a tension spring 25 shown on the alternative perspective form of FIG. 8.

The dimensions, especially the length of the arms 24a, 24b, is adapted to the distance formed between the side of the longitudinal member 1d and that of the skirt 7d, so that the sole-plate 23 is applied against the inner face of the skirt so as to keep it away from the longitudinal member.

Figure 8:
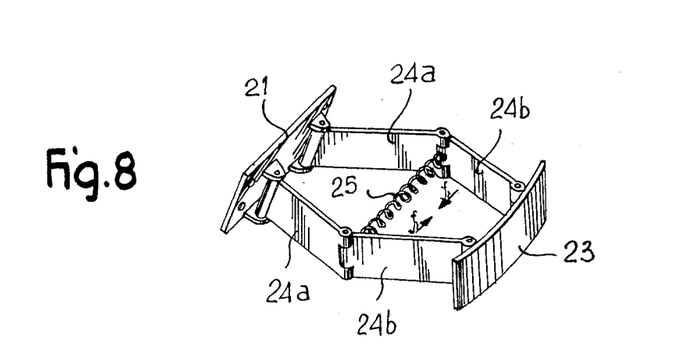
FIG. 8 represents a perspective view of an equipment apparatus for the device of FIG. 6.

The alternative form of FIG. 8 differs from that which has just been described by the fact that the plate 21 comprises simply holes for mounting by means of screws on the side of the longitudinal or transverse member. It should be noted that such elastic devices are mounted at intervals along the outer sides of the platform frame.

In FIG. 9, there is again seen one of the two openings 3a of the flooring 3 of the platform, and the fan 5g. This latter comprises an impeller 27 having a relatively large diameter with respect to the radial dimension of its blades, and a cylindrical diffuser or scroll 28, the lateral wall of which practically encloses only three quarters of the impeller 27.

Figure 9:
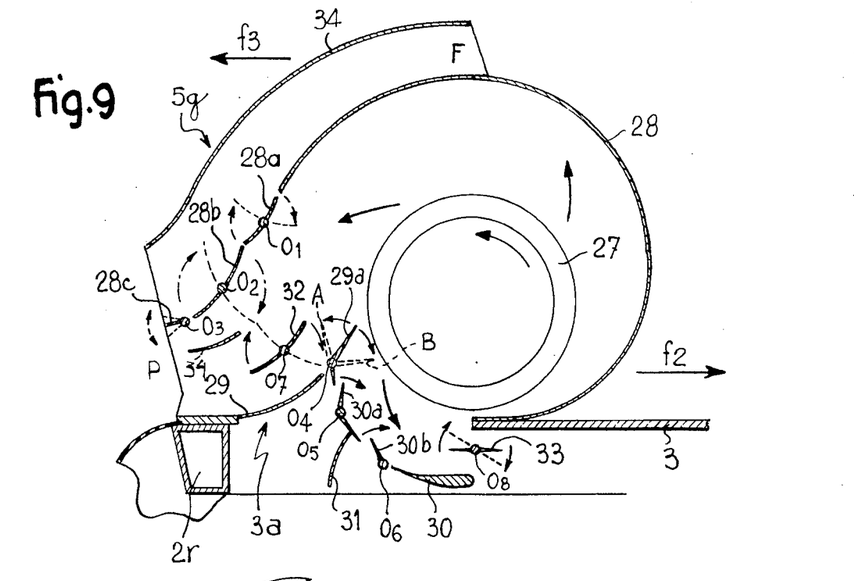
FIG. 9 is a diagrammatic view in cross-section of an adjustable air distribution device associated with a centrifugal fan capable of equipping the vehicle shown in FIGS. 1 and 5.

One of the extremities of this wall 28 is fixed on the front edge of the opening 3a, and the other end portion is constituted by two slightly curved shutters 28a, 28b and an end shutter 28c. These three shutters are respectively mounted on transverse pivotal shafts 01, 02, 03.

A curved cylindrical wall 29 is fixed by one of its extremities on the transverse edge of the rear portion of the opening 3a. The other extremity of this wall 29 is equipped with an articulation axis 04 for a shutter 29a which can sweep over an area practically adjacent to the field of rotation of the blades of the impeller 27.

The rear portion of this wall 29 and the shutters 28a to 28c constitute an outlet nozzle towards the rear P and the shutter 29a separates the flow of air from the impeller 27 into two streams, respectively directed towards the nozzle P and the opening 3a.

Another cylindrical air-guiding wall 30 is mounted transversely between the longitudinal members 1m, 1g and also between 1m and 1d. This wall comprises two shutters 30a, 30b, articulated transversely at 05 and 06, and another air guiding wall element 31 is arranged between these two shutters.

Finally, a shutter 32 in the form of an airguiding blade, is transversely articulated at 07, inside the nozzle P which comprises the shutter 28b. It should be stated that the lengths of the shutters 28b and 32 and the relative positions of their pivotal shafts 02 and 07 are adapted to the height of the outlet section of this nozzle in order to be able to close this latter.

In addition, the passage formed by the front edge of the opening 3a and the wall 30 is also provided with a shutter 33, also articulated on a transverse axis 08.

Finally, a transverse cylindrical wall 34 is fixed on extensions of the sides of the scroll and extends above the wall 28 of the end shutter 28c up to the top of this scroll, in order to form another nozzle F, to which further reference will be made later.

It will be indicated that the shafts of the shutters referred to above may be actuated by known means from the driving station in the cabin 4. In addition, the fan 5d is identical with the fan 5g described above and the shutters of these two fans may be operated at will or in synchronism, so as to effect various driving and steering operations which are described below.

The positions of the shutters of the two fans being as shown in FIG. 9, and the engine 6 being running, two currents of air are established through the openings 3a so as to give two longitudinal air cushions separated by the partitions 9d and 9g. The blades 10 to 13 ensure the uniformity of supply to each of these cushions from the front to the rear of the vehicle.

This uniformity of supply will ensure a uniform distribution of the air pressure on the various parts of the skirt 7, 8 which tends to take the shape of a balloon by virtue of the fixing effects of the bracing members 14 and the elastic cables 26, so as to produce a practically uniform lifting thrust from the various parts of the platform. This latter is thus raised and maintained at a height $h$ above the ground, while the lower edge of the skirt 7, 8 has a spacing $e2$ with respect to the ground, for the escape of air from the cushion (see FIG. 4).

The rate of flow is different on the two faces of the band 8, since the speed of flow is smaller on the face associated with the bracing members 14. In consequence, the air pressure is greater on this face than on the other face. This difference in pressure generates a force directed downwards, the vertical component of which has the effect of stabilizing the fixing point of the cables 26 on the band 8. This result is applicable to relatively-high skirts equipped with sets of two cables, to which reference will be made later.

Simultaneously, two other currents of air escape through the two outlet nozzles P so as to generate by reaction a thrust (arrow $f2$) ensuring the displacement of the vehicle.

The two shutters 21a can then be actuated so as to bring them, for example, into the position A of FIG. 9, and to increase the flow-rate of air from the cushion chambers to the detriment of the two currents of propulsion air, and thus increase the height $h$ of "flight" of the vehicle with a view to adapting its displacement to the amplitudes of the irregularities of the ground. In this respect, it is also possible to actuate the sets of shutters 30a, 30b, and also if so desired the two shutters 33 in order to modify the air distribution between the front and rear parts of the cushion for the purpose of maneuvres such as putting the nose up, to compensate for such irregularities.

Conversely, the two shutters 29a may be brought into the position B (FIG. 9) in order to reduce the height of flight or to increase the speed of propulsion of the vehicle, but at each instant the two tail shutters 28c may be actuated in order to regulate the outlet section of the nozzles P as a function of the output of the two fans, for the purpose of obtaining a maximum propulsion thrust.

In addition, it is possible to actuate the shutters 32 in order to reduce the flow of air in its outlet nozzles P and in consequence the speed of the vehicle. In this connection, the shutters 28b enable a part of these propulsion currents to be deflected towards the nozzles F so as to generate a thrust (arrow $f3$) which is obviously opposite to the propulsion thrust (arrow $f2$), and thus gives a braking effect. This braking may be reinforced by the action of the two shutters 28a after these latter have been opened, until a relatively rapid stopping of the vehicle is obtained.

Finally, the two sets of shutters 32 and 28b may be brought into the closure position of the propulsion nozzles P and the two shutters 28a may be opened so as to provide a reverse travel of the vehicle.

These driving operations of the vehicle are obviously obtained by identical and practically synchronized manoeuvres of the shutters of the two fans, and it is clear that different judiciously combined manoeuvres of the corresponding shutters of the two fans would cause turning or pivotal movements while running forward or in reverse. These evolutions of steering may be effected in a remarkably flexible manner in view of the very elastic method of lift provided by the two cushions of the platform of the vehicle.

In this connection, the cables 26 and their possible springs 26r operate in the same manner as elastic cables in order to permit various movements of their skirts.

In particular, the external skirts 7, 8 may be spaced apart towards the exterior and upwards in order to obtain a reduction in volume of the chambers, which facilitates the damping of shocks due to irregularities of surface.

In addition, the sole plates 23, by virtue of the articulations 21 usefully accompany the band 7 in order to facilitate these displacements of the outer skirt when such damping phenomena take place.

Figure 10:
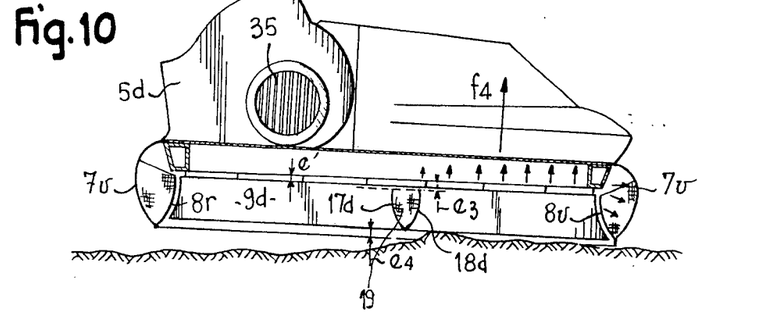
FIG. 10 shows diagrammatically a longitudinal cross-section of the skirt device of FIG. 6.

Furthermore, as shown in FIG. 10, when the front portion 7v of the skirt comes into abutment against an obstacle (irregularity of ground or a wave on a water surface), the leakage of air from the portion of the cushion comprised between the front portions 7v, 8v and the partitions 18d and 18g is reduced. In this way, the air pressure of these parts of the two chambers tends to increase, without influence on the operation of the two fans, which generates a restoring couple (arrow $f4$) and reestablishes the cushion.

It is also possible to provide suspension means, adjustable at will, for the partitions 17 and 18, in order to adjust the spacings $e3$, $e4$. The distance $e3$ is formed between the lower edge of te blades 11, 12 and the upper edge of the bands 17, 18, while the distance $e4$ is formed between the lower edges of these partitions and the ground. Their adjustments serve to modify the value of the above-mentioned restoring couple.

In addition, when the leakage of air from one of the sides 7d, 8d for example is accidentally stopped by the effect of a wave, the output of the corresponding fan 5d tends to diminish and, taking into account the particular characteristics of working of fans of the centrifugal type, the condition of operation of the fan 5d is modified so as to supply a smaller flow of air at a higher pressure. As the working condition of the other fan 5g has not varied, this results in a very large transverse restoring couple which rapidly re-establishes the right-hand cushion.

Bands 9d, 9g may furthermore be associated by adjustable suspension means with the longitudinal member 1m in order to regulate the height of their upper edges with respect to the ground. These adjustments give a restoring couple which is approximately proportional to the inclination which the apparatus may assume.

The anomalies of operation of the cushion due to such incidents of travel are rapidly counterbalanced by the exchanges of air which may take place under the platform between the partitions. The two outer longitudinal members and the cross-members are further provided with holes 1t in order to ensure the correct supply to the roll of the skirt. In addition, the thrust of the sole-plates 23 enables the disturbing effects of obstacles, for example those of waves, to be reduced under the platform, as these effects may result in damage to the skirt.

Finally, it will be noted that the blades 10 to 13 ensure a circulation of air in the form of approximately vertical columns. Each distribution of the flow permits a limitation of the consequences of an accidental leakage of air due to a local irregularity of the surface, such as an obstacle, a ditch or a wave. Such a leakage causes disturbance in one column and results in a curvature of the other columns of air which creates an over-pressure acting to oppose their movement towards this leakage.

This result could be amplified by the use of flexible baffles arranged transversely in staggered relation in each of the two chambers.

The foregoing description makes it possible to understand that the method of lift of the vehicle on two longitudinal cushions:
separated from each other;
equipped with a transverse partition arrangement, and
respectively supplied by fans of the centrifugal type, gives remarkable results of stability, irrespective of the obstacles which may arise on the path of the vehicle, especially over water.

By reason of the effectiveness of these cushions, it is possible to produce vehicles of relatively small size without interfering with these results, whereas known types of cushion result in a size having a substantially greater order of magnitude.

In addition, the combination of propulsion means for forward and reverse running, with the supply means for the two cushions, is well adapted to a moderate-cost production of a vehicle of this type. The means for driving, steering and braking are constituted by simple shutters and the usual devices permitting good co-ordination of control of the corresponding shutters.

It will be understood that the outputs of the fans, their power and in consequence that of the motor, must be suited to the loads carried by the platform. In this connection, particular features of vehicles similar to that of FIGS. 1 to 5 are indicated in the Table below so as to more readily appreciate the possibilities which have been referred to.

|  | A | B |
|---|---|---|
| Length | 5 m. | 6.50 to 7 m. |
|  |  | 2.50 m. |
| Width | 2.30 m. |  |
| Number of parts |  |  |
| Petrol engine - Type "Renault R 16" |  |  |
| - Output | 60–100 HP | 160 HP approx. |
| Fan |  |  |
| - Output | 15 to 18 cu.m./min. | |
| - Pressure under the platform in cm.WG | 8 to 15 cm. | 14 to 25 cm. |
| Speed of vehicle | 100 km/hr | 140 km/hr |

In addition, the tensile strength of the springs 26r is greater as the cables 26 are spaced farther apart from each other. Good results are obtained by adopting the values in the following Table:

| No. of cables 26 per bracer 14 | | 1 | 2 |
|---|---|---|---|
| Distance between bracers 14: | 1.00 m. | 120 kg. | 60 kg. |
| | 0.50 m. | 60 kg. | 30 kg. |

It should be stated that it is possible to obtain over water high speeds of travel of the order of 300 km/hr without adversely affecting the stability of vehicles provided with cushion chambers of this kind and in consequence, rapid and safe transport can be provided.

In addition, in order to obtain economical transport, it is obviously necessary to utilize as low a power as possible. This power is mainly a function of the conditions of suction of the flow-rate of air which must be ejected by the propulsion nozzles P.

To this end, (see FIG. 11) the intake orifice of each fan 5d and 5g is equipped with a ring 35 comprising blades 36 which extend vertically. This direction is substantially perpendicular to the usual direction of movement of the vehicle.

Figure 11:
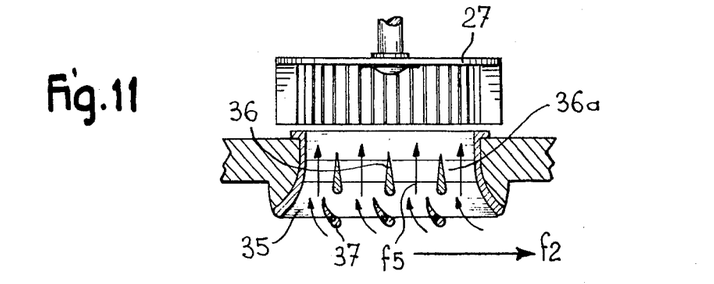
FIG. 11 represents a horizontal cross-section of a detail of the suction opening of a centrifugal fan equipping the device of FIG. 9.

These blades are directed parallel to the axis of the impeller 27 and are rigidly braced by streamlined blades 36a arranged horizontally and fixed on the ring 35.

Another blade 37 is arranged vertically facing each blade 36 and in font of this latter with respect to the axial direction of the ring 35. This blade is suitably articulated on the ring 35 and has a transverse section in the form of a gutter. Its concave face is directed in the sense of movement towards the front of the vehicle so as to form a device similar to the conventional louvres of aircraft wings which prevent the phenomena of detachment of fluid at high speeds.

By virtue of the leading edge in the direction of movement of these moving blades, it is possible by a judicious adjustment of their angles of incidence to ensure an excellent supply of the fans (arrows f5), even at high vehicle speeds, by virtue of acceptable pressure losses in the intake orifice of the fans. At such speeds, this device avoids the use of prohibitively large power.

It should be stated that the moving blades 37 could be replaced by two fixed blades having leading wings substantially larger than those of the blades of FIG. 11. Such blades would also ensure a correct operation of the fans.

It is clear that it would not be outside the scope of the invention to replace certain devices described above by other known means giving similar effects. For example, the shutter and nozzle devices of FIG. 4 could replace those of FIG. 9.

Furthermore, a platform could be equipped with three or more longitudinal cushion chambers, each chamber being similar to the chamber described above and supplied from a fan of the centrifugal type, independently of the other chambers.

In addition, similar stability results would be obtained like those described above by supplying such chambers separately by means of fans for which, at a predetermined speed of rotation, the pressure of the flow of air varies inversely with the flow-rate of this air, effects of this kind being ensured by centrifugal fans.

In addition, in the case of a relatively long platform, there may be provided, in the extension of longitudinal chambers of acceptable size such as those referred to above, other similar chambers each associated with a supply means giving the advantages of fans of the centrifugal type.

Finally, the devices formed by composite skirts suspended from a platform, could be applied to the formation of a cushion based on known supply methods different from these described above. Such devices ensure good performance of skirts and partitions when encountering various obstacles.

In this connection, in the case of skirts having a relatively great height, tthe peripheral skirt is fixed to the platform by sets of two cables 26 with springs, fixed to the same point on the platform. This advantageously avoids an excessive curvature of the external edges of the bracing members 14 fixed on the band 7, by providing for this edge two circular arcs of smaller radius. Each elastic cable 26 is fixed to the band 8 by being located on the centre line of the chord of the corresponding arc.

The invention having now been explained and its advantage justified by a detailed example, the Applicant reserves the exclusive right during the whole period of the patent, without any limitation other than that of the terms of the appended claims.

What we claim is:

1. An air-cushion vehicle, comprising:

A platform equipped with flexible bands forming skirts, and particularly a continuous peripheral skirt said peripheral skirt comprising an outer band attached to said platform; an inner band spaced from said outer band at its upper edge and attached to said outer band at spaced intervals by vertically flexible bracing panels, said inner band being fixed at intervals to said platform by suspension means and cables, means for supplying air under pressure to the cushion formed under said platform by said bands;

propulsion devices mounted on said platform, said flexible bands under the platform being longitudinal and transverse skirts forming with said bands and particularly said peripheral skirts, at least two chambers extending longitudinally side by side and being supplied with air each independently of the other chamber, said chambers being in communication with each other, the skirts of said air cushion allowing circulation of air under pressure from one chamber to the next for generating a force couple to restore said vehicle to a predetermined equilibrium position after having been rolled to an inclined position during motion of said vehicle.

2. An air-cushion vehicle as claimed in claim 1, in which said means for supplying air to a chamber comprise a fan of the centrifugal type and each longitudinal chamber is equipped with at least one transverse skirt having a smaller height than that of the other skirts.

3. An air-cushion vehicle as claimed in claim 1, in which said propulsion means comprise nozzles respectively coupled to said means supplying air to the chambers of the cushion.

4. An air-cushion vehicle as claimed in claim 2, in which each said fan of a cushion chamber is coupled to a propulsion nozzle directed towards the rear and to a braking and reversing nozzle directed towards the front.

5. An air-cushion vehicle as claimed in claim 4, in which each said propulsion nozzle is provided with means for regulating its outlet section.

6. An air-cushion vehicle as claimed in claim 1, and further comprising a frame composed of three longitudinal members, identical with each other, and two cross-members, said longitudinal and cross-members carrying a platform flooring and being arranged in the form of floats.

7. An air-cushion vehicle as claimed in claim 6, and further comprising two identical longitudinal cushion chambers respectively associated with two identical fans and coupled to the same driving shaft, said chambers communicating with each other by spaces formed between said central longitudinal member and the central skirt carried by said central member.

8. A skirt device constituted by flexible bands, applicable to an air-cushion vehicle as claimed in claim 1, in which one of said bands extends parallel to said peripheral band and is associated in part here and there with this latter by flexible means so as to constitute a composite peripheral akirt, said skirt being fixed at intervals to said platform by suspension means and by cables.

9. A skirt device as claimed in claim 8, in which further bands are suspended longitudinally and transversely in the chamber formed by said composite peripheral skirt, and are fixed to each other in pairs here and there by flexible bracing members and to the platform by cables.

10. A skirt device as claimed in claim 9, and further comprising pairs of longitudinal and transverse bands respectively associated with each other at intervals by flexible means in the form of flexible bracing members having edges in the form of a circular arc, so as to form longitudinal and transverse skirts, the external skirt being stabilized by the internal skirt.

11. A skirt device as claimed in claim 9, in which each said cable is fixed to a flexible band of a skirt and is arranged along the centre line of the chord of the arc of the other band of said skirt.

12. A skirt device as claimed in claim 10, in which the bands of said longitudinal and transverse skirts are suspended from said platform by means for adjusting their height above the ground.

13. A skirt device as claimed in claim 8, and further provided at intervals with devices having soleplates and adapted to ensure an elastic thrust towards the exterior and upwards, on the upper parts of said peripheral skirts.

14. A centrifugal fan comprising an impeller and a scroll casing adapted to be utilized with an air-cushion vehicle according to claim 1, in which said scroll casing is equipped with a wall forming a propulsion nozzle, directed towards the rear and separating the flow of air from said impeller into two streams directed respectively towards said nozzle and towards a cushion chamber.

15. A centrifugal fan as claimed in claim 14, and further comprising means for regulating the flow-rates of the two streams to the nozzle and the cushion chamber.

16. A centrifugal fan as claimed in claim 14, in which said scroll casing comprises sides fixed to a wall forming a braking nozzle directed towards the front, means being provided for supplying said nozzle from the flow of air delivered by said impeller.

17. A centrifugal fan as claimed in claim 16, in which the means for supplying said braking nozzle are constituted by transverse shutters forming part of a wall of said propulsion nozzle.

18. A centrifugal fan as claimed in claim 14, in which said propulsion nozzle is equipped with a shutter for regulating the outlet section of said nozzle.

19. A centrifugal fan as claimed in claim 14, in which the scroll casing of each said fan comprises an orifice for coupling to an opening in the cushion platform, said coupling orifice being equipped with shutters for distribution of air.

20. A centrifugal fan as claimed in claim 14, in which the inlet orifice of each fan is fitted with a ring comprising fixed blades directed parallel to the axis of the impeller of said fan and rigidly braced by streamlined blades arranged horizontally and fixed on said ring together with moving blades arranged vertically with respect to each fixed blade.

21. An air-cushion vehicle, comprising:
A platform equipped with flexible bands forming skirts, and particularly a peripheral skirt;
means for supplying air under pressure to the cushion formed under said platform by said bands;
propulsion devices mounted on said platform, said flexible bands under the platform being longitudinal and transverse skirts forming with said bands and particularly said peripheral skirts, at least two chambers extending longitudinally side by side and being supplied with air each independently of the other chamber, said chambers being in communication with each other, the skirts of said air cushion allowing circulation of air under pressure from one chamber to the next for generating a force couple to restore said vehicle to a predetermined equilibrium position after having been rolled to an inclined position during motion of said vehicle, the upper part of each said cushion chamber comprising streamlined elements in the form of blades respectively disposed transversely between the sides of the external longitudinal members and the central longitudinal member, said blades having heights smaller than those of the sides of said longitudinal members and their lower edge being located at the level of the bottoms of said longitudinal members, said transverse blades being higher as they are further away from the air-supply means for said chamber.

22. An air-cushion vehicle as claimed in claim 21, in which each said chamber is equipped with transverse shutters permitting regulation of the air distribution in various parts of said chamber.

23. An air-cushion vehicle, comprising:
A platform equipped with flexible bands forming skirts, and particularly a peripheral skirt;
means for supplying air under pressure to the cushion formed under said platform by said bands;
propulsion devices mounted on said platform, said flexible bands under the platform being longitudinal and transverse skirts forming with said bands and particularly said peripheral skirts, at least two chambers extending longitudinally side by side and being supplied with air each independently of the other chamber, said chambers being in communication with each other, the skirts of said air cushion allowing circulation of air under pressure from one chamber to the next for generating a force couple to restore said vehicle to a predetermined equilibrium position after having been rolled to an inclined position during motion of said vehicle, one of said bands extending parallel to said peripheral band and being associated in part with this latter by flexible means so as to constitute a composite peripheral skirt, said peripheral skirt being fixed at intervals to said platform by suspension means and by cables, devices provided at intervals with sole-plates and adapted to ensure an elastic thrust towards the exterior and upwards on the upper parts of said peripheral skirts, said sole-plate devices comprising a plate fastened by a longitudinal articulation member to the outer side of the peripheral longitudinal member, its upper part being subjected to the thrust of a compression spring supported against the side of said longitudinal member, said plate being fixed elastically to a sole-plate applied against the internal face of said skirt by a system of two sets of arms respectively articulated on said plate, between each other and on said sole-plate in the form of a lozange, the central articulation elements of this system being associated with each other by a tension spring.

* * * * *